Jan. 19, 1960  M. B. HUTSON  2,922,098
ADJUSTABLE SPEED INDUCTION MOTOR
Filed Oct. 22, 1958
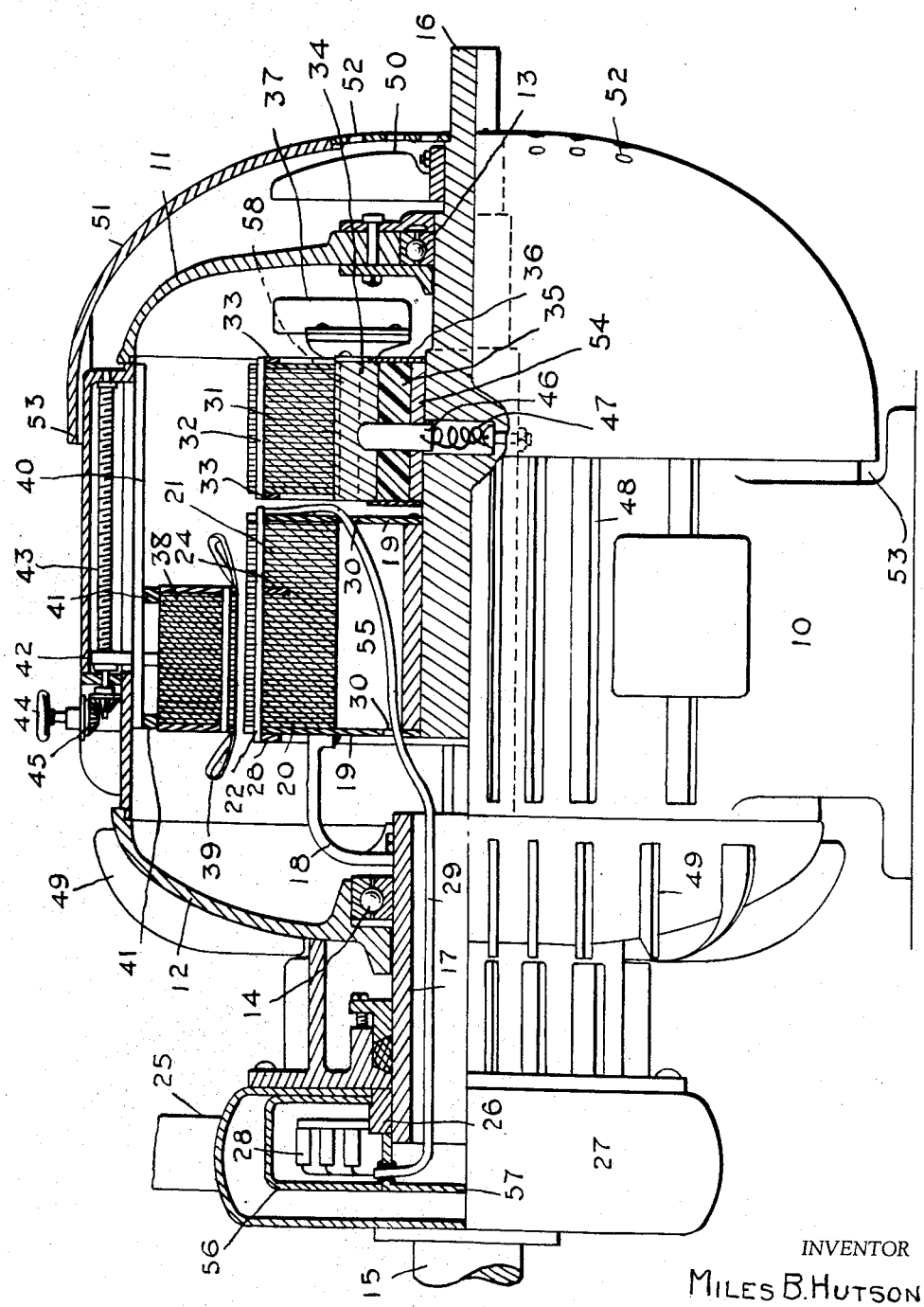
INVENTOR
MILES B. HUTSON
BY Holcombe, Wetherill + Brisebois
ATTORNEYS United States Patent Office 2,922,098
Patented Jan. 19, 1960

2,922,098

ADJUSTABLE SPEED INDUCTION MOTOR

Miles B. Hutson, New Orleans, La.

Application October 22, 1958, Serial No. 769,018

15 Claims. (Cl. 318—243)

The present invention relates in general to variable speed squirrel cage induction motors with motor structure control of the motor circuit, and more particularly to that type using high and low resistance rotor elements with a common stator, the stator and different portions of the rotor elements being mechanically brought into operative relation in varying degree to vary the mechanical and electrical characteristics of the motor.

A requirement still not attained to a satisfactory degree in the present art with simplicity of structure, is good speed control with low slip and high starting torque, and this in an explosion-proof motor with avoidance of undue heating of the motor windings.

Accordingly, an object of the invention is the provision of a squirrel cage induction motor of the above type having nonstep or continuously variable speed control with high starting torque, and low slip normal torque at normal speed, and capable of embodiment in an explosion proof motor.

Another object is the provision of a squirrel cage motor having high and low resistance rotor sections in which the major portion of the resistance of the high resistance rotor circuit is located sufficiently remote therefrom to remove it from substantial heat transfer relation with the rotor and stator parts.

A further object is the provision of a squirrel cage induction motor having a high resistance, slow speed rotor element and enclosed in an explosion proof casing to render it explosion proof, in which the major portion of heat generated in the circuit of the high resistance rotor section is generated in a cooling chamber remote from the rotor section, and through which chamber a suitable coolant may be circulated through conduits isolated from the surrounding atmosphere.

A further object is the provision of a squirrel cage motor having control of its operating characteristic by relative axial movement of stator and rotor in which the movement necessary for a full range of control is reduced to a minimum.

Various other objects and advantages of the invention will become apparent from a perusal of the following specification and the accompanying drawing in which the single view is a side elevation partly in section in a vertical, axial plane.

Referring to the drawing, the motor is provided with a closed housing formed in general of the hollow frame element 10 and end bells 11 and 12. End bells 11 and 12 support the motor drive shaft through bearings 13 and 14, the shaft being formed with a solid portion 16 journaled in bearing 13 and a hollow portion 17 journaled in bearing 14. A circular array of spider arms or brackets 18 secures the solid and hollow shaft portion in coaxial alignment through one of the circular end plates 19 carried rigidly on the solid portion 16 of the drive shaft.

The circular end plates 19 carry a squirrel cage driving rotor of laminated magnetic material formed in two sections 20 and 21, the rotor being built up of flat ring-form laminae to leave a hollow central portion 55 through which are passed circuit conductors as later described. Rotor conductor bars 22 extend axially through the rotor in conventional manner near the periphery from end to end and are provided with a first end ring 23 at one end of the rotor, an intermediate conductor ring 24 intermediate the ends of the rotor, and a second end ring 26 for the other ends of the conductor bars situated remotely from the rotor in the chamber of a cooling pump 27. Electrical connection of the conductor bars to the second ring 26 is made through individual resistance elements 28, and individual insulated circuit conductors 29 passing through the hollow portion 55 of the rotor between the rotor and the shaft via openings 30 in the end plates 19 and the hollow shaft portion 17.

There is thus provided; for the first rotor section 20 a relatively low resistance circuit including the end ring 23, intermediate ring 24, and the portion of the conductor bars 22 therebetween; and for the second section 21, a relatively high resistance circuit including the intermediate conductor ring 24, the second ring 26, and the remaining portion of the conductor bars 22, each in series with its respective individual circuit conductor 29 and resistance 28.

Hollow metal fin elements 56 inclose the resistance elements supported therein and insulated therefrom in any known or other suitable manner. The fins 56 rotate with the motor shaft within the chamber of the cooling pump 27 and operate as impeller blades for circulating fluid coolant through the chamber of the cooling pump 27 via suction conduit 15 and discharge conduit 25 suitably isolated from the local surrounding atmosphere and the interior of the motor. Thus heat transferred from the resistances 28 to the fins 56 is readily absorbed by the fluid coolant either of gas or a liquid. The advantage of this structure is that the greater bulk or portion of the resistance of the high resistance circuit is concentrated at a point remote from the motor elements out of substantial heat transfer relation therewith in a cooling zone isolated from the interior of the motor and surrounding atmosphere, and without the use of slip rings. Isolation of the interior of the cooling pump from the interior of the motor is effected by the hub element 57 and suitable fluid-tight packing where the conductors 29 pass through the hub.

The axial length of section 21 of the rotor as determined by the position of the intermediate conductor ring 24 is substantially one-half that of the first section 20, the two sections being substantially continuous with minimum axial separation by the relatively thin intermediate conductor ring 24.

A normally free running, nondriving, low torque rotor element 31 of laminated low reluctance magnetic material carried on a supporting ring 34 is rotatably mounted on the solid portion 16 of the drive shaft through a low-friction bearing-ring 35 of suitable plastic material or other bearing means such as oil impregnated bronze-ball or roller bearings secured to the drive shaft through a supporting collar 54. Stop rings 36 hold the free running rotor 31 against axial movement. The nondriving rotor 31, nondriving in the sense that it does not drive the drive shaft 16—17, is provided with conductor bars 32 and end rings 33, and carries fan blades 37 for cooling the motor when the drive shaft is turning slowly or not at all.

A suitable rotating induction field for the rotors is provided by a single conventional stator 38 with energizing winding 39 encircling the rotors and of an axial length substantially equal to that of the first section 20 of the driving rotor. Guide rails 40 fixed to the motor frame for receiving stator bearing elements 41 in sliding relation provide means slidably mounting the stator for axial movement along the rotors from covering relation with the first section 20 as shown in the drawing, through covering relation with the remainder of the driving rotor section 21, to a position beyond the driving rotor into covering relation with the nondriving rotor 31 only.

Any known or other suitable means for gradually adjusting the stator into any of the positions above mentioned may be used, such as that here shown consisting of a traveling nut 42 secured to the stator and engaged by the feed screw 43, and a hand wheel 44 for rotating the screw through gearing 45. It will be understood that the hand wheel may be replaced by any known or other suitable motor means responsive to speed or torque for automatic control of the motor.

At low speeds when the stator is partly over the driving rotor and partly over the low torque rotor 31, or at standstill with the stator over the low torque rotor only, the low torque rotor 31 is driven with sufficient force to rotate freely about the motor shaft and operate the fan blades 37. However, it is desirable at higher speeds, when the stator is wholly out of operative relation to the low torque rotor, to have this fan in operation. To this end there is provided suitable centrifugal clutch means for coupling the low torque rotor 31 to the motor shaft when the stator is not in magnetic relation to the rotor 31, and the motor shaft is near full speed. As here shown the centrifugal clutch consists of a weighted pin 46 nested in a radial bore in the shaft and normally held therein out of engagement with the rotor supporting ring 34 by a retractile spring 47 tensioned to so hold the pin at low speeds and to be overcome by the weight of the spring and pin by centrifugal force near full speed of the shaft. This brings the pin into coupling engagement with the rotor supporting ring 34 as shown in the drawing.

To complete a free path for circulation of entrapped air through the interior of the motor, the supporting ring 34 is provided with air passages 58. This arrangement permits the circulation of air from the hollow portion 55 of the driving rotor 20—21 through the passages 58 to the fan 37, thence back between the stator and rotors to the hollow portion 55 of the driving rotor.

To further cool the motor, in addition to the cooling provided by the internal fan blade 37, and without circulation of outside air through the interior of the motor casing, the outer walls of the frame 10 and end bell 12 are provided with heat radiating ribs 48 and 49 cooled by an outside, shaft-driven fan 50. Air moved by the fan 50 is directed over the radiating ribs 48 and 49 by a cowling 51, having inlet openings 52 near the center and spaced radially from the outer walls of the motor at its periphery to provide a discharge opening 53 directing outside air over and around the motor surfaces.

In operation, at start, with the stator over only the high resistance section 21 of the driving rotor and part of the low torque rotor 31, the motor is given high starting torque with high slip and low current drain from the line by the stator. Then by moving the stator on over the low resistance section 20, the effective resistance of the driving rotor 20—21 is gradually reduced and the motor is gradually brought to a characteristic giving low slip and substantially constant speed with load changes. To reduce speed it is necessary only to reverse the process by gradually moving the stator back over the high resistance section 21 toward covering relation with the nondriving rotor 31. As the stator is moved toward the nondriving rotor 31 to reduce torque on the motor shaft at any speed point to compensate for low loads, there is maintained a complete magnetic circuit for the stator even when out of covering relation with the driving rotor 20—21. Thus, the motor may be kept in stalled position with full voltage applied to the stator without drawing enough current from the line to overheat the motor. All values from no torque to full speed low slip, may thus be obtained without steps, by a shifting of the stator an axial distance of approximately one and one-half times the axial length of the stator.

Where many starts are required the motor may remain connected to the line and be started and stopped merely by shifting the stator or even allowed to run in reverse under external force, such as the weight of a lifting hook in hoist service. This feature, which permits the motor to be kept in the stalled position, or even run in reverse by power supplied by a reverse movement of the load, without drawing excessive current from the line, makes it possible, where desired, to have two motors connected to run in opposite directions and both connected to the same load, so that simply by shifting their stators simultaneously the load may be driven in either direction at various speeds.

Heat generated in the motor at low shaft speeds is adequately removed by the fan blades 37 on the low torque rotor which rotor at such times is within the stator field and runs free of the motor shaft, due to disengagement of the centrifugal clutch means 36—37 in response to low shaft speeds. At higher shaft speeds the centrifugal clutch comes into operation to couple the low torque rotor 31 with the motor shaft so that the fan blades 37 run at efficient speeds at all speeds of the motor.

While but one specific embodiment of the invention has been herein shown and described for the sake of disclosure, it is to be understood that the invention is not limited to such specific embodiment but contemplates all such variants and modifications thereof as fall fairly within the scope of the appended claims.

What is claimed is:

1. A squirrel cage motor comprising a driving rotor having conductor bars extending axially therethrough near the periphery from end to end, a first end ring connecting the bars at one end, an intermediate conductor ring connecting the bars intermediate the ends of the rotor dividing the rotor into a first section between the first end-ring and the intermediate conductor ring and a second section between the intermediate ring and the other end of the rotor, a second end-ring situated out of substantial heat transfer relation with the rotor and connected with the bars at their other ends each through a resistance element situated out of heat transfer relation with the rotor, a stator surrounding the rotor and of an axial length substantially equal to that of the said first section of the driving rotor, and means slidably mounting the stator for axial movement along said driving rotor from covering relation with said first section through covering relation with the remainder of the rotor to a position wholly beyond the driving rotor.

2. A squirrel cage motor comprising a driving rotor having conductor bars extending axially therethrough near the periphery from end to end, a first end ring connecting the bars at one end, an intermediate conductor ring connecting the bars intermediate the ends of the rotor dividing the rotor into a first section between the first end-ring and the intermediate conductor ring and a second section between the intermediate ring and the other end of the rotor, a second end-ring situated out of substantial heat transfer relation with the rotor and connected with the bars at their other ends each through a resistance element situated out of heat transfer relation with the rotor, a stator surrounding the rotor and of an axial length substantially equal to that of the said first section of the driving rotor, a low torque nondriving rotor element of magnetic material equal in axial length to that of the stator mounted in axial alignment with the driving rotor, and means slidably mounting the stator for axial movement along said driving rotor from covering relation with said first section through covering relation with the remainder of the rotor to a position beyond the driving rotor into covering relation with the low torque rotor.

3. A squirrel cage motor comprising a driving rotor having conductor bars extending axially therethrough near the periphery from end to end, a first end ring connecting the bars at one end, an intermediate conductor ring connecting the bars intermediate the ends of the rotor dividing the rotor into a first section between the first end-ring and the intermediate conductor ring and a second section between the intermediate ring and the other end of the rotor, a second end-ring situated out of substantial heat transfer relation with the rotor and connected with the bars at their other ends each through a resistance element situated out of heat transfer relation with the rotor, a stator surrounding the rotor and of an axial length substantially equal to that of the said first section of the driving rotor, a low torque nondriving rotor element of magnetic material equal in axial length to that of the stator mounted in axial alignment with the driving rotor, fan blades carried by the low torque rotor for cooling the motor, means slidably mounting said stator for axial movement along said rotors from covering relation with said first section of the driving rotor through covering relation with the remainder of the driving rotor to a position beyond the driving rotor into covering relation with the low torque rotor, and centrifugal clutch means rotatable with the driving rotor for effecting a driving connection between the driving rotor and the low torque rotor.

4. A squirrel cage motor comprising a driving rotor, a first end-ring at one end of the rotor, an intermediate conductor ring situated intermediate the ends of the rotor dividing the rotor into a first section between the first end-ring and the intermediate conductor ring and a second section between the intermediate ring and the other end of the rotor, said second section being approximately one half the axial length of the first section, conductor bars extending axially through the rotor near the periphery from the first end ring to the intermediate ring and thence to the said other end of the rotor, a second end ring situated outside the rotor and spaced therefrom, a resistance element for each said conductor bar connecting its associated bar with the outside second end ring, a low torque nondriving rotor of magnetic material equal in axial length to that of the first section of the rotor, a stator surrounding the rotors of an axial length substantially equal to that of said first section of the driving rotor, and means slidably mounting said stator for axial movement along said rotors from covering relation with said first section of the driving rotor through covering relation with the remainder of the driving rotor to a position beyond the driving rotor into covering relation with the low torque rotor only.

5. A squirrel cage induction motor comprising a unitary driving rotor formed of a body of contiguous laminae, an end ring at one end of the rotor, an intermediate conductor ring embedded in the body of contiguous laminae greater in radial depth but thinner than said end ring to have substantially the same conductivity as the end ring and occupy minimum axial space with minimum axial separation of the laminae while dividing the rotor into a first section between said first end of the rotor and the intermediate ring, and a second section between the intermediate ring and the other end of the rotor, an end ring for the second section, a relatively low resistance circuit for the first section including the intermediate ring, a relatively high resistance circuit for the second section including said intermediate ring, a nondriving rotor equal in length to that of the first section of the driving rotor, positioned adjacent the second section in axial alignment with the driving rotor, a stator surrounding the rotors of an axial length substantially equal to that of said first section, and means slidably mounting said stator for axial movement along said rotors from covering relation with said first section of the driving rotor through covering relation with the remainder of the driving rotor to a position beyond the driving rotor into covering relation with the nondriving rotor only.

6. In a squirrel cage induction motor, a driving rotor, a relatively low resistance circuit for a portion of the rotor completed through an end-ring at one end of the rotor and a conductor ring intermediate the ends of the rotor, a relatively high resistance circuit for the remainder of the rotor between the intermediate ring and the other end of the rotor having the major portion of its resistance located at a point out of substantial heat transfer relation with the rotor, a stator surrounding the rotor of an axial length substantially equal to that portion of the rotor between the end ring and the intermediate conductor ring, and means slidably mounting said stator for movement along said rotor from covering relation with that portion of the rotor between the end and intermediate rings toward said other end of the rotor.

7. A squirrel cage induction motor comprising a stator, a driving rotor having a low resistance section and a high resistance section axially juxtaposed, the low resistance section having an axial length substantially equal to that of the stator and the high resistance section an axial length equal to substantially one half that of the low resistance section, a coolant chamber remote from said stator and rotor, said high resistance section having the bulk of its resistance situated in said coolant chamber, means for circulating a coolant through said chamber, and means slidably mounting said stator for axial movement along said rotor from covering relation with said low resistance section to covering relation with said high resistance section.

8. A squirrel cage induction motor comprising a stator, a rotor assembly having a driving rotor element with high and low resistance sections axially juxtaposed and a low torque nondriving rotor element all in axial alignment, the low resistance section having an axial length substantially equal to that of the stator and the high resistance section an axial length equal to substantially one half that of the low resistance section, cooling fan blades carried by said nondriving rotor, a coolant chamber remote from said stator and rotor assemblage, said high resistance section having the bulk of its resistance situated in said coolant chamber, and means slidably mounting said stator for axial movement along said rotor assembly from covering relation with said low resistance section through covering relation with said high resistance section to a position beyond the driving rotor into covering relation with the low torque rotor only.

9. A squirrel cage induction motor as claimed in claim 8 having centrifugal clutch means rotatable with the driving rotor for effecting a driving connection between the driving rotor and the low torque rotor.

10. A squirrel cage motor comprising a stator, a driving rotor, a first end ring at one end of the rotor, an intermediate conductor ring situated intermediate the ends of the driving rotor dividing the rotor into a first section between said one end and the intermediate ring and a second section between the intermediate ring and the other end of the rotor, said first section having an axial length substantially equal to that of said stator, conductor bars connecting said first end ring and intermediate end ring forming a relatively low resistance circuit for the first section, said bars extending through to the other end of the rotor, a second end ring for the second section located out of substantial heat transfer relation with the rotor and stator, resistance elements located near the second end ring connecting the bars of the second section with said second end ring to form a relatively high resistance circuit for the second section having the bulk of its resistance located out of substantial heat transfer relation with the rotor and stator, and means slidably mounting the stator for axial movement along the rotor.

11. A motor as claimed in claim 10 in which the second section of the driving rotor is substantially one half the axial length of the first section.

12. A squirrel cage induction motor comprising a squirrel cage driving rotor having low and high resistance sections, a free running nondriving squirrel cage rotor of low reluctance material in axial alignment with said driving rotor in juxtaposition to the said high resistance section, fan blades carried by said nondriving rotor, a stator surrounding said rotors having an axial length substantially equal to that of said low resistance section, and means slidably mounting said stator for axial movement along said rotors from covering relation with the nondriving rotor only through covering relation with said high resistance section to a position in covering relation with said low resistance section only.

13. In a squirrel cage induction motor, a driving rotor, a relatively low resistance circuit for a portion of the rotor completed through an end-ring at one end of the rotor and a conductor ring intermediate the ends of the rotor, a relatively high resistance circuit for the remainder of the rotor between the intermediate ring and the other end of the rotor having the major portion of its resistance located at a point out of substantial heat transfer relation with the rotor, a stator surrounding the rotor of an axial length substantially equal to that portion of the rotor between the end ring and the intermediate conductor ring, and means mounting said stator and rotor for relative axial movement to change from a position with the stator in covering relation with that portion of the rotor between the end and intermediate rings toward said other end of the rotor.

14. A squirrel cage induction motor comprising a stator, a driving rotor having a low resistance section and a high resistance section axially juxtaposed, the low resistance section having an axial length substantially equal to that of the stator and the high resistance section an axial length equal to substantially one half that of the low resistance section, a coolant chamber remote from said stator and rotor, said high resistance section having the bulk of its resistance situated in said coolant chamber, means for circulating a coolant through said chamber, and means mounting said stator and rotor for relative axial movement to change from a position with the stator in covering relation with said low resistance section to a position with the stator in covering relation with said high resistance section.

15. A squirrel cage induction motor as claimed in claim 8 in which the low torque rotor element is free to rotate independently of the driving rotor element, together with centrifugal clutch means rotatable with the driving rotor element for effecting a driving connection between the driving rotor and the low torque rotor.

No references cited.